Feb. 28, 1967　　　　　　G. L. MYERS　　　　　　3,306,015
SAFETY CURTAIN FOR FARM IMPLEMENTS
Filed Aug. 4, 1964　　　　　　　　　　　　　　2 Sheets-Sheet 1

INVENTOR.
G. L. MYERS

BY John M Nolan

ATTORNEY

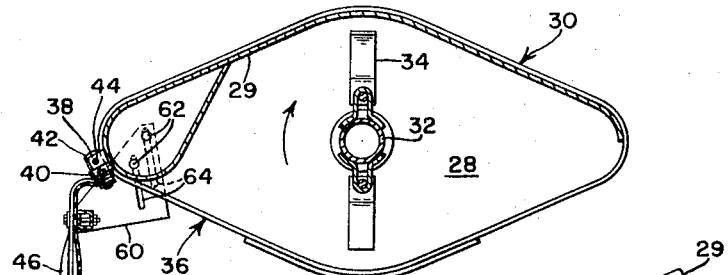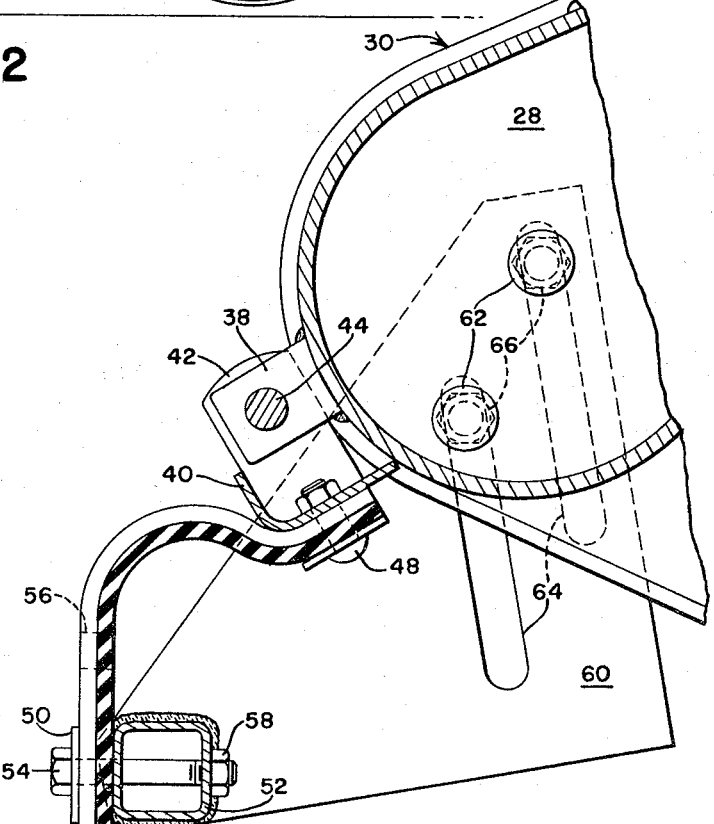

United States Patent Office 3,306,015
Patented Feb. 28, 1967

3,306,015
SAFETY CURTAIN FOR FARM IMPLEMENTS
Glenn L. Myers, Ottumwa, Iowa, assignor to Deere & Company, Moline, Ill., a corporation of Delaware
Filed Aug. 4, 1964, Ser. No. 387,396
8 Claims. (Cl. 56—24)

This invention relates to a safety curtain for farm implements and more particularly to an improved, overlapping, and adjustable safety curtain for ensilage harvesters, mowers, shredders, and similar machines of the rotary type.

The present invention will be described for use on a flail type shredder. Such a machine is used to shred corn stalks, weeds, grass, brush, or similar materials and is generally drawn and powered by a tractor. Radial blades rotate around a horizontal shaft transverse to the direction of travel, the blades moving in the direction of travel at the point in their rotation nearest to the ground. The rotating blades are generally covered by a hood which is open toward the front and the bottom to allow the introduction of the material into the machine. Frequently foreign bodies such as stones, metal, and similar materials are encountered by the blades, which are rotating at a high rate of speed, and the foreign bodies are thrown forwardly and upwardly through the hood opening at a high velocity, imperiling the driver of the tractor. To prevent this, various types of curtains have been suspended over the opening, some being comprised of sections of resilient materials, such as described in the patent to J. K. Campbell, U.S. Patent No. 3,027,701, and others being formed by a line of relatively rigid fingers swingably suspended from a shaft.

The present invention is an improvement in the construction of this safety curtain and comprises overlapping resilient flaps arranged in two rows so as to prevent the expulsion of materials between adjacent flaps. The present invention also provides two adjustments by which the gap between the bottom of the curtain and the ground can be varied. The entire curtain can be moved up or down to compensate for wear on the flap ends or to adjust for a specific use, and the individual flaps can also be moved up or down to permit the curtain to conform to the contour of the ground, such as in shredding high ridged row crops, or to compensate for wear on individual flaps.

Accordingly an object of the present invention is to provide an improved safety curtain for farm and like implements.

Another object is to provide such safety curtain in the form of a plurality of flaps in which both the individual flaps and the entire curtain are adjustable in height from ground.

Still another object is to provide a safety curtain comprising two overlapping parallel rows of resilient flaps. Still another object of the present invention is to provide a safety curtain of rugged construction that is nevertheless inexpensive to manufacture and that can be furnished as original equipment as well as for attachment to existing machines.

These and other objects of the invention will become apparent from a consideration of the detailed drawings and description which follow wherein an embodiment of the present invention is described for use on a flail type shredder.

In the drawings:

FIG. 2 is a section of the ensilage shredder taken along line 2—2 of FIG. 1.

FIG. 3 is an enlarged view of part of FIG. 2 showing the safety curtain and its mounting.

Figure 1:
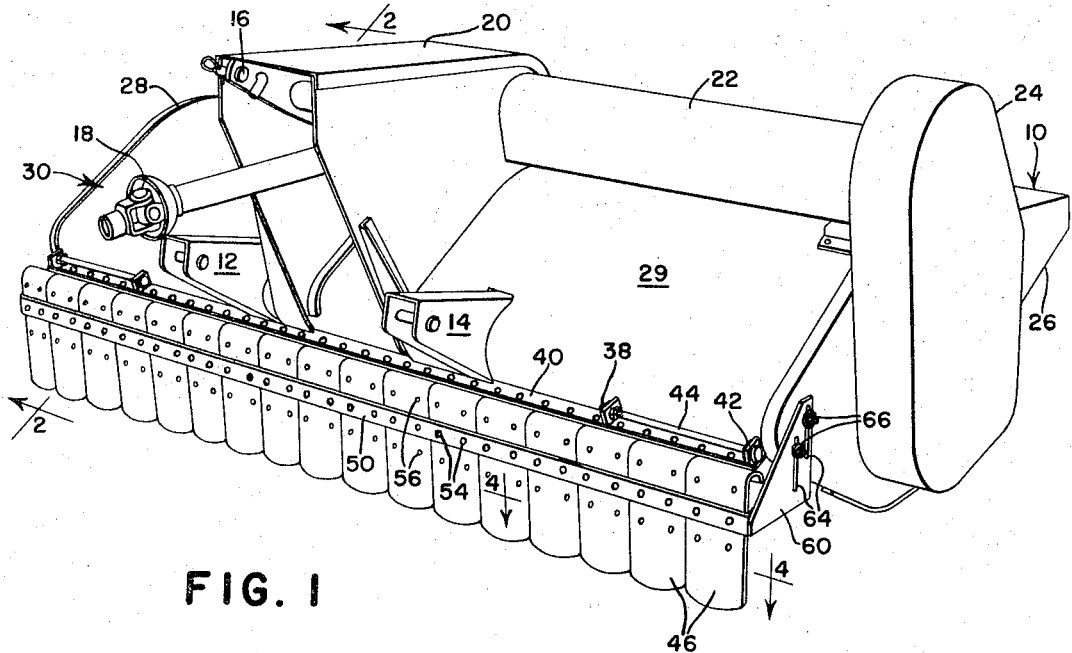
FIG. 1 is a front perspective of the ensilage shredder showing the safety curtain.

Referring now to the drawings, there is shown a flail type shredder 10 which is attachable to a tractor by means of lower hitch links 12 and 14 and an upper hitch link 16. A shreddder drive shaft 18 is connected to the power take-off on the tractor and to a drive means (not shown) which rotates under the drive shields 20, 22, and 24, for driving a rotor shaft 32 in the direction indicated by the arrow in FIG. 2. Shaft 32 extends transversely to the line of travel and carries a plurality of axially spaced flails 34 which extend radially when the shaft rotates at high speed. The rotor, made up of shaft 32 and flails 34, is housed by a hood 30 comprised of end shields 26 and 28, at opposite ends of an overlying substantially semi-circular center member 29, the bottom or ground side of which is of course open. As the machine moves forward, the material to be shredded enters through front entrance 36 and is shredded by the rotating flails 34. The direction of rotation of the rotor is such that the material is chopped and is carried forwardly and upwardly and then rearwardly and downwardly and is returned to the ground.

Apertured brackets 38 project from the front of the hood 30. An angle bar 40 extends across the front of the hood, having transverse apertured projections 42, the angle bar being attached to brackets 38 by means of pins 44 which extend through the apertures in adjacent brackets 38 and projections 42. The rear edge of the angle bar 40 seats against the front of the hood 30. Two rows of resilient flaps 46 are attached to the bottom of the angle bar 40 by means of fasteners 48 which extend through one end of flaps 46 and bar 40. The flaps are also clamped between a clamping bar 50 and a channel iron 52, which also extend across the front of the hood, by means of bolts 54 extending through the bar, holes 56 in flaps 46, and the channel iron, nuts 58 then being tightened on the bolts. Alternate vertically alined holes 56 are provided through each flap 46, providing a means for varying the length of the flaps below the clamping.

The channel iron 52 is affixed at opposite ends to brackets 60. One bracket 60 is adjustably affixed to the end shield 26 and the other is adjustably affixed to the end shield 28 by means of bolts 62 extending through holes in side shields 26 and 28 and through approximately vertical parallel slots 64 in each bracket 60. The height of each bracket 60, of the channel iron 52 which is affixed thereto, and consequently of the flaps 46 which are clamped to channel iron 52, is thus adjustable by sliding the brackets 60 along the bolts 62, and then clamping the brackets in the desired position by tightening nuts 66 on the bolts 62. This adjustment is possible despite the fact that the top ends of the flaps are fixed, since they are made of resilient material and can bow between the clamps and the fixed end.

Figure 4:
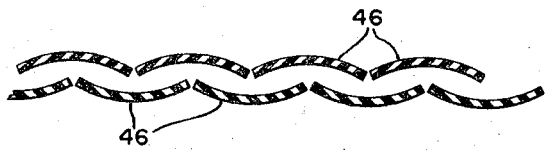
FIG. 4 is a partial horizontal section of the safety curtain taken along line 4—4 of FIG. 1.

Flaps 46 are advantageously made of tire casings which tend to form bowed cross sections as shown in FIG. 4. The unclamped ends of such flaps also tend to curl in the direction of their concavity. To minimize such curling, the front and rear rows of flaps 46 are opposed to and mounted concave to each other, the curling tendency in each flap being opposed by the curling tendency of its opposite flap. In addition, to prevent material from ejecting between adjacent flaps in the same row, the rows are staggered, the center of each flap in one row opposing the edges of the proximate flaps in the other row, as shown in FIG. 4.

Other features and advantages of the present invention will readily occur to those skilled in the art, as will many modifications and alterations in the preferred embodiment of the invention, all without departing from the spirit and scope of the present invention.

What is claimed is:

1. In a machine of the class described having a horizontal rotor transverse to the direction of machine travel and including a plurality of radial knives travelling forward at the bottom of their arcs and partially enclosed from above in a hood open at its bottom, a safety curtain comprising a horizontal bar affixed at each end to a bracket mounted in a vertically adjustable position on the hood, and a plurality of depending resilient flaps having their upper ends affixed to and sealed against the horizontal front edge portion of said hood across its width, each flap also being affixed between its ends to said horizontal bar in a vertically adjustable manner.

2. In a machine of the class described having a horizontal rotor transverse to the direction of machine travel and including a plurality of radial knives travelling forward at the bottom of their arcs and partially enclosed from above in a hood open at its bottom, a safety curtain comprising a horizontal bar affixed at each end to a bracket mounted in a vertically adjustable position on the hood, and a plurality of depending resilient flaps laterally spaced at relatively close intervals in two transversely adjacent staggered rows and having their upper ends affixed to and sealed against the horizontal front edge portion of said hood across its width, each flap also being affixed between its ends to said horizontal bar in a vertically adjustable manner.

3. In a machine of the class described having a horizontal rotor transverse to the direction of machine travel and including a plurality of radial knives travelling forward at the bottom of their arcs and partially enclosed from above in a hood open at its bottom, a safety curtain comprising, a horizontal bar affixed at each end to a bracket mounted in a vertically adjustable position on the hood, and a plurality of depending resilient flaps, side by side in two transversely adjacent staggered rows, having their upper ends affixed to a horizontal front edge portion of said hood across its width, each flap also being affixed between its ends to said horizontal bar in a vertically adjustable manner.

4. In a machine of the class described having a horizontal rotor transverse to the direction of machine travel and including a plurality of radial knives travelling forward at the bottom of their arcs and partially enclosed from above in a hood open at its bottom, a safety curtain comprising, a horizontal bar affixed at each end to a bracket mounted on the hood and a plurality of depending resilient flaps, side by side in two transversely adjacent staggered rows, having their upper ends affixed to and sealed against the horizontal front edge portion of said hood across its width, each flap also being affixed between its ends to said horizontal bar in a vertically adjustable manner.

5. In a machine of the class described having a horizontal rotor transverse to the direction of machine travel and including a plurality of radial knives travelling forward at the bottom of their arcs and partially enclosed from above in a hood open at its bottom, a safety curtain comprising a horizontal bar affixed at each end to a bracket mounted in a vertically adjustable position on the hood, and a plurality of depending resilient flaps side by side in two transversely adjacent staggered rows, having their upper ends affixed to and sealed against the horizontal front edge portion of said hood across its width, each flap also being affixed between its ends to said horizontal bar.

6. In a machine of the class described having a horizontal rotor transverse to the direction of machine travel and including a plurality of radial knives travelling forward at the bottom of their arcs and partially enclosed from above in a hood open at its bottom, a safety curtain comprising, a horizontal bar affixed at each end to a bracket mounted in a vertically adjustable position on the hood, and a plurality of depending resilient flaps, side by side in two transversely adjacent staggered rows, having their upper ends affixed to and sealed against the horizontal front edge portion of said hood across its width, each flap also being affixed between its ends to said horizontal bar in a vertically adjustable manner.

7. The invention defined in claim 6 in which: the bottom edge portions of the flaps in each row are bowed and concave to the bottom edge portions of the flaps in the opposing row.

8. In an agricultural machine of the class described having an axially horizontal rotor including a plurality of radial knives and partially enclosed in a hood supported above the ground and open toward the bottom, said bottom opening having an edge generally parallel to the rotor axis and spaced in advance of the lower portion of the rotor relative to the direction of rotation, the combination therewith of a safety curtain comprising: a plurality of flexible flaps and means operatively connected to the hood and the flaps for vertically adjustably mounting the flaps on the hood in two adjacent, staggered, parallel rows substantially coextensive with and depending from said bottom opening edge, said flaps being collectively or individually adjustable.

References Cited by the Examiner

UNITED STATES PATENTS

| | | | |
|---|---|---|---|
| 3,027,701 | 4/1962 | Campbell | 56—24 |
| 3,147,577 | 9/1964 | McClellan et al. | 56—504 |
| 3,186,021 | 6/1965 | Krier et al. | 15—340 |

ABRAHAM G. STONE, *Primary Examiner.*

ANTONIO F. GUIDA, *Examiner.*